United States Patent
Stevens, III

(10) Patent No.: US 9,241,031 B2
(45) Date of Patent: *Jan. 19, 2016

(54) SELECTING AN AUXILIARY EVENT-PACKAGE SERVER

(75) Inventor: Ira C. Stevens, III, Quakertown, PA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 219 days.

This patent is subject to a terminal disclaimer.

(21) Appl. No.: 13/287,225

(22) Filed: Nov. 2, 2011

(65) Prior Publication Data
US 2013/0036227 A1    Feb. 7, 2013

Related U.S. Application Data

(63) Continuation-in-part of application No. 13/196,208, filed on Aug. 2, 2011, now Pat. No. 8,521,839.

(51) Int. Cl.
*G06F 15/16* (2006.01)
*H04L 29/08* (2006.01)
*H04L 29/06* (2006.01)

(52) U.S. Cl.
CPC .......... *H04L 67/1008* (2013.01); *H04L 65/105* (2013.01); *H04L 65/1006* (2013.01); *H04L 65/1073* (2013.01)

(58) Field of Classification Search
CPC ............ H04L 67/1029; H04L 67/1004; H04L 2029/06054; H04L 47/10; H04L 47/125
USPC ........................................................ 709/217
See application file for complete search history.

(56) References Cited

U.S. PATENT DOCUMENTS

| | | | | |
|---|---|---|---|---|
| 6,460,036 B1 * | 10/2002 | Herz | ............................. | 707/748 |
| 6,725,253 B1 * | 4/2004 | Okano et al. | .................. | 709/203 |
| 7,103,809 B2 * | 9/2006 | Schlangen | .................... | 714/47.3 |
| 7,412,521 B2 * | 8/2008 | Olson et al. | .................... | 709/227 |
| 7,805,517 B2 * | 9/2010 | Shim et al. | ..................... | 709/227 |
| 7,912,954 B1 * | 3/2011 | Oesterreicher et al. | ........ | 709/226 |
| 8,064,342 B2 * | 11/2011 | Badger | ........................ | 370/230 |

(Continued)

OTHER PUBLICATIONS

Technet (Technet, TS Session Broker Load Balancing Step-by-Step Guide, May 22, 2008, Technet.com, http://technet.microsoft.com/en-us/library/cc772418(v=ws.10).aspx, p. 1-23).*

(Continued)

*Primary Examiner* — Brian J Gillis
*Assistant Examiner* — Michael A Keller

(57) ABSTRACT

A method includes registering with a proxy for an auxiliary event-package, wherein the auxiliary event-package is provided by a plurality of auxiliary event-package servers. The method may further include subscribing to the auxiliary event-package through the proxy. The proxy forwards the subscription to the plurality of auxiliary event-package servers. The method may include receiving notification from each of the auxiliary event-package servers. The notification includes an indicator of capacity of the auxiliary event-package server. The method may include determining an auxiliary event-package server having a highest capacity based on the indicators of capacity of the auxiliary event-package servers. In addition, the method may include selecting the auxiliary event-package server having the highest capacity as a primary handle for the auxiliary event-package.

17 Claims, 7 Drawing Sheets

(56) References Cited

U.S. PATENT DOCUMENTS

| | | | |
|---|---|---|---|
| 8,159,961 B1* | 4/2012 | Rai et al. | 370/252 |
| 2002/0038360 A1* | 3/2002 | Andrews et al. | 709/223 |
| 2006/0047751 A1* | 3/2006 | Chen et al. | 709/205 |
| 2006/0168319 A1 | 7/2006 | Trossen | |
| 2006/0246880 A1 | 11/2006 | Baldwin et al. | |
| 2007/0168417 A1* | 7/2007 | Swanburg et al. | 709/203 |
| 2008/0065652 A1* | 3/2008 | McCann et al. | 707/100 |
| 2008/0076573 A1* | 3/2008 | Loehrer | 463/42 |
| 2008/0101335 A1* | 5/2008 | Badger | 370/352 |
| 2008/0240686 A1* | 10/2008 | Nagaya et al. | 386/124 |
| 2011/0161458 A1* | 6/2011 | Rumelhart | 709/217 |
| 2011/0225298 A1* | 9/2011 | Brown et al. | 709/226 |
| 2012/0158941 A1* | 6/2012 | Ganapathi et al. | 709/223 |
| 2012/0278440 A1* | 11/2012 | Iyer | 709/219 |

OTHER PUBLICATIONS thefreedictionary.com, definition of auxiliary, The Free Dictionary by Farlex, retrieved Jan. 14, 2015.* thefreedictionary.com, definition of primary, The Free Dictionary by Farlex, retrieved Jan. 14, 2015.* thefreedictionary.com, definition of secondary, The Free Dictionary by Farlex, retrieved Jan. 14, 2015.*

* cited by examiner

```
NOTIFY sip:user@10.211.55.3:1430;transport=TCP SIP/2.0

Max-Forwards: 70

Capacity: 9

Contact:
<sip:profile@166.35.250.202:13100;rinstance=827027bb7917b598;transport=TCP>

To: <sip:user@ucc.providerbusiness.com>;tag=7d72f81f

From: <sip:profile@package.providerbusiness.com>;tag=292be912

Call-ID: ABCD1234

CSeq: 1 NOTIFY

Subscription-State: active

Event: profile

Content-Length: 0
```

FIG. 1C

SELECTING AN AUXILIARY EVENT-PACKAGE SERVER

RELATED APPLICATION

The present application is a continuation-in-part (CIP) of U.S. patent application Ser. No. 13/196,208, entitled "Auxiliary Event-Packages" and filed Aug. 2, 2011, the disclosure of which is hereby incorporated by reference herein in its entirety.

BACKGROUND INFORMATION

Many network providers are migrating to communication networks that employ session control protocols, such as Session Initiation Protocol (SIP). SIP is a session signaling protocol for creating, modifying, and terminating sessions at the application layer. SIP may create, modify, and terminate sessions (e.g., telephone calls, instant messaging conferences) among participants of the session. Proxies are typically employed to handle session signaling on behalf of devices in the SIP oriented network. The proxy may handle session signaling for many (e.g., thousands or millions) devices.

BRIEF DESCRIPTION OF THE DRAWINGS

FIG. 1C is a diagram of an exemplary Session Initiation Protocol (SIP) header in a NOTIFY message;

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

An event-package is a service on a network for which a device may subscribe and receive notifications of events. Event-packages in SIP oriented networks are implemented in a published and subscribed based architectural pattern ("pub/sub model"). In other words, the SIP event-package may be a hub of a particular feature set, such as presence, which is distributed to subscribers. SIP event-packages are often tightly integrated with a SIP soft-switch, which may be clustered and load balanced.

Embodiments disclosed herein relate to devices, methods, and systems for selecting an auxiliary event-package server (AEPS) as a primary handle for an auxiliary event-package. Consistent with the embodiments described herein, a user agent may receive a notification from each of a plurality of AEPSs. The notification may identify a capacity of each AEPS and update a user agent of changes to the capacity of the AEPS. The user agent may determine an AEPS having a highest capacity for a particular auxiliary event-package and may select the AEPS having the highest capacity as a primary handle for the auxiliary event-package. In some instances, e.g., in a SIP oriented network, the notification may include a header tag, e.g., a SIP header tag that is included in a NOTIFY SIP message, and which includes a relative measure of AEPS capacity for the auxiliary event-package type. Load balancing for the AEPSs may thereby be implemented based on relative capacities of the AEPSs.

Figure 1A:
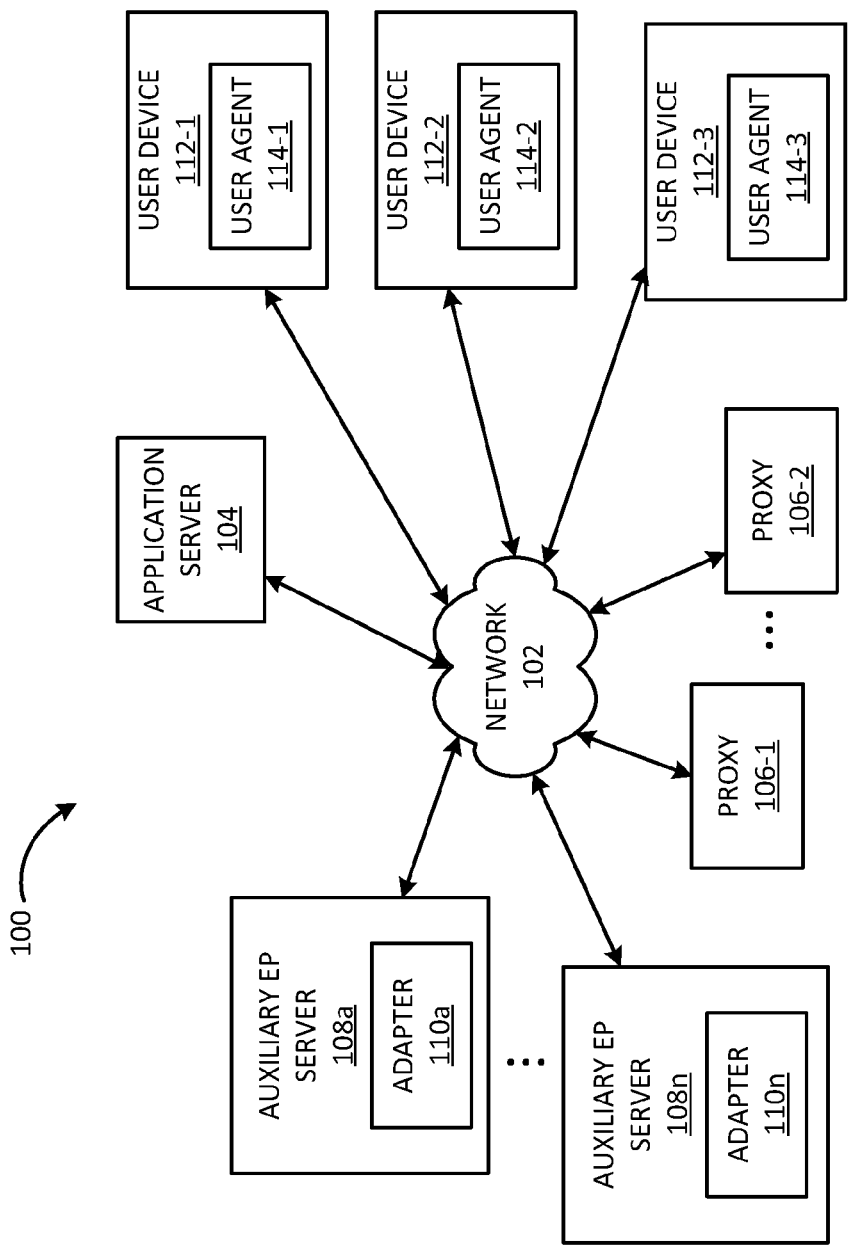
FIG. 1A is a block diagram of exemplary components of a network for implementing embodiments disclosed herein.

FIG. 1A is a diagram of an exemplary network 100 in which systems and/or methods described herein may be implemented. As illustrated, network 100 may include an application server 104, a plurality of proxies 106 (individually, "proxy 106-x"), a plurality of auxiliary event-packages servers (AEPSs) 108a-108n, and numerous user devices 112 (individually, "user device 112-x") coupled to a network 102. Components of network 100 may be interconnected via wired and/or wireless connections. The configuration of components of network 100 illustrated in FIG. 1A is for illustrative purposes only. Other configurations may be implemented. Therefore, network 100 may include additional, fewer and/or different components than those depicted in FIG. 1A. Also, in some instances, one or more of the components of network 100 may perform one or more functions described as being performed by another one or more of the components of network 100.

Network 100 may comprise a SIP oriented network 100, such as: an Internet Protocol (IP) network using SIP proxies 106; an IP Multimedia Subsystem (IMS) network using SIP proxies 106; and/or a Long Term Evolution (LTE) network with Voice over LTE using SIP proxies 106. SIP is a request/response protocol used for signaling in, for example, voice over IP (VoIP) networks. In addition to SIP proxies 106, network 100 may include SIP soft-switches, and SIP gateways (not shown) that facilitate signaling in a SIP oriented network 100.

In SIP, the peer-to-peer relationship between two devices is known as a "dialog." The dialog provides the context to facilitate exchange of messages between devices (including, for example, user devices 112 and AEPSs 108a-108n) in network 100. Messages exchanged between devices can be, for example, either a request or response associated with the request. A request and its responses may be referred to as a "transaction." The devices in network 100 may communicate using a connection oriented protocol, such as transmission control protocol (TCP) and/or a connectionless communication protocol, such as user datagram protocol (UDP) or IP. A dialog may include one or more transactions. In network 100, for example, user device 112-1 may subscribe to an event-package provided by AEPSs 108a-108n. The subscription may be established using one of proxies 106 and a session control protocol, such as SIP, as described below.

User devices 112 may include mobile telephones, personal digital assistants (PDAs), laptop computers, desktop computers, tablet computers, or another type of computation or communication device. User devices 112 may connect to network 102 via wired, wireless, and/or optical connections. User devices 112 may include a transceiver (not shown) to transmit and receive SIP messages. User devices 112 may include user agents 114 that implement SIP according to the Internet Engineering Task Force (IETF) document Request For Comments (RFC) 2543 and document RFC 3261. User agents 114 may be implemented for a single address of record (AOR) that corresponds to a single user. The AOR includes a user name and a domain with which the AOR is associated. There may be multiple instances of a single AOR. For example, an end user may log in to a messaging application on multiple user devices 112 including a mobile phone, personal computer, and PDA. Corresponding user agents 114 in this instance are all registered to a single AOR. User agents 114 may register and subscribe for SIP services in network 100 through proxies 106.

Proxy 106 may include a device that facilitates the establishment, definition, and termination of sessions, such as telephone calls, on behalf of other devices in network 100 (e.g., user devices 112). Proxies 106 may be aggregated to form a SIP proxy farm that is associated with a particular SIP domain. Network 100 may include a load balancer (not shown) for the SIP proxy farm. Proxies 106 may route requests to user device's 112 locations, authenticate and authorize user devices 112 for services provided through proxies 106, implement call-routing policies, and provide features to user devices 112. The services and features provided through proxies 106 may include event-packages, which are services on network 100 for which the devices 112 can subscribe and receive notifications. SIP event-packages may be provided through an integrated SIP soft-switch or alternately, through AEPSs 108a-108n, for instance as described in RFC 3265 (SIP specific event notification) and RFC 3903 (SIP extension for event state publication).

Each of AEPSs 108a-108n may provide auxiliary event-packages to subscribing user devices 112 on network 100 through proxies 106. AEPSs 108a-108n may comprise hardware, software or a combination of hardware and software that hosts auxiliary event-packages and provides the auxiliary event-packages to authorized and/or authenticated devices using a network protocol. Each of AEPSs 108a-108n may host a same auxiliary event-package. These auxiliary event-packages may be unknown to the SIP soft-switch and SIP gateway.

The auxiliary event-packages provide access to extenuating or ancillary actions to a published event, such as contingent access to a database or other predetermined action. According to one implementation, a particular soft-switch may have a particular set of extensions defined by an event-package that is integrated with the soft-switch. An auxiliary event-package may be implemented in network 100 to extend features of user agent 114 and user device 112 with features that are not included in the event-package for the soft-switch. The auxiliary event-package may be specific to a particular network 100 and may not be supported by a CPE (customer premises equipment) vendor or manufacturer of a particular user device 112. AEPSs 108a-108n may support applications and functionality that is specific to and provided by the telecommunications service provider that maintains network 100.

AEPSs 108a-108n may distribute particular feature sets, such as presence to subscribing user devices 112 or user agents 114. For example, a user agent 114 in network 100 may update a presence status by publishing information regarding presence of the device. In this instance, the auxiliary event-package is a third party event-package to a SIP soft-switch. However, AEPSs 108a-108n may not be tightly integrated with the SIP soft-switch and issues may arise with regards to load balancing network 100.

Application server 104 may support access side protocols in network 100 including SIP, media gateway control protocol (MGCP) and network-based call signaling (NCS). Application server 104 may include a database of user and group profiles as well as service and subscription data. According to one implementation, application server 104 and adapters 110a-110n of AEPSs 108a-108n comprise a SIP publisher client cluster. Application server 104 may publish SIP messages to AEPSs 108a-108n. Adapters 110a-110n may be collocated and communicate with AEPSs 108a-108n. Adapters 110a-110n may receive a published SIP message from application server 104 and transform the published SIP message, for example, into a notification message input to AEPSs 108a-108n (designated as "notify" in the SIP protocol). AEPSs 108a-108n may output the notification message to subscribing user devices 112 or user agents 114 through proxies 106. The published SIP message may be distributed via network 102 to subscribers of that auxiliary event-package, as described below.

Network 102 may include a wired or wireless network. Network 102 may include a wireless public land mobile network (PLMN) (e.g., a cellular network). The PLMN may include a Code Division Multiple Access (CDMA) 2000 PLMN, a Global System for Mobile Communications (GSM) PLMN, an LTE PLMN and/or other type of PLMN. In addition to a wireless network, network 102 may include one or more other networks of various types, such as, for example, a telecommunications network (e.g., a Public Switched Telephone Network (PSTN)), a local area network (LAN), a wide area network (WAN), a metropolitan area network (MAN), an intranet, the Internet, and/or a cable network (e.g., an optical cable network). Network 102 may also include a wireless satellite network.

In instances in which SIP event-packages are auxiliary to the SIP soft-switch and/or unknown to the SIP soft-switch, SIP gateway or proxy 106, the presence of these auxiliary event-packages in SIP oriented network 100 increases the difficulty of load-balancing SIP oriented network 100. Signal diagrams described below demonstrate implementations of load balancing based on relative capacities of AEPSs 108a-108n in SIP oriented network 100.

Figure 1B:
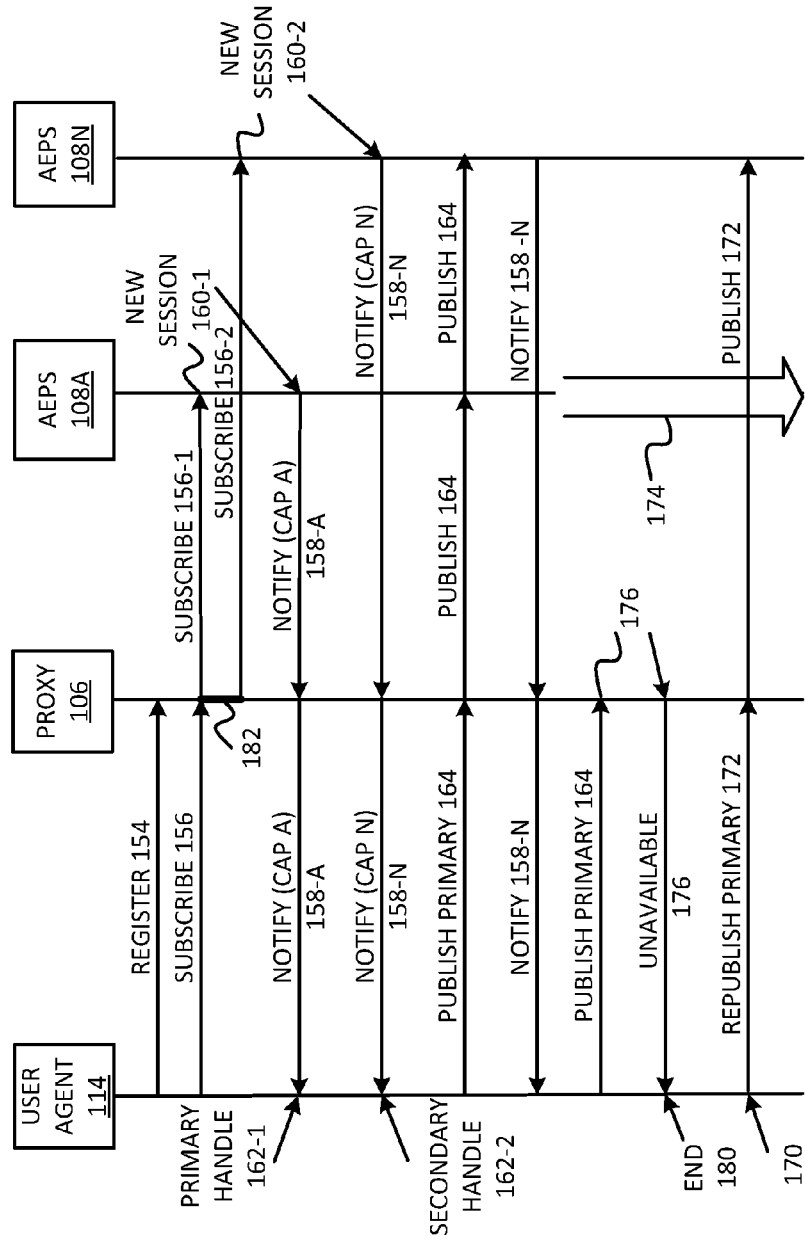
FIG. 1B is a signal diagram of exemplary messages selecting an auxiliary event-package server as a primary handle.

FIG. 1B illustrates a signal diagram 150 of exemplary dialogs implementing load balancing based on relative capacities of AEPSs 108a-108n in SIP oriented network 100. As illustrated, signal diagram 150 may include transactions between user agent 114, proxy 106, and AEPSs 108a-108n. The transactions illustrated in FIG. 1B for illustrative purposes. Other transactions may be implemented. Therefore, signal diagram 150 may include additional, fewer and/or different components and/or transactions than those depicted in FIG. 1B. Also, in some instances, one or more of the components of signal diagram 150 may perform one or more transactions described as being performed by another one or more of the components of signal diagram 150.

As shown in signal diagram 150, user agent 114 may register 154 with proxy 106. User agent 114 may subscribe 156 to an auxiliary event-package located in a SIP domain maintained by proxy 106. The auxiliary event-package may be provided through AEPSs 108a-108n. AEPSs 108a-108n may have registered with proxy 106 prior to user agent 114 registering 154 with proxy 106. Proxy 106 may fork 182 (as defined in RFC 3261) the subscription 156 (subscribe 156-1, subscribe 156-2) to all registered AEPSs 108a-108n that maintain that auxiliary event-package. For example, proxy 106 may fork 182 the subscription 156 by forwarding the single subscription 156 to multiple endpoints, which in this case corresponds to each of the plurality of AEPSs 108a-108n.

AEPSs 108a-108n may respond with a normal accept (designated as a 200 series message in SIP protocol) and a notify 158 (notify 158-A and notify 158-N from AEPS 108a and AEPS 108n, respectively). Each notify 158 may include information indicating a current capacity (CAP) of a responding AEPS 108 (e.g., notify 158-A may include an indicator of a current capacity (CAP A) of AEPS 108*a*, notify 158-N may include an indicator of a current capacity (CAP N) of AEPS 108*a*, etc.).

The capacity indicator may provide a relative measure of capacity for a corresponding AEPS 108 for a same auxiliary event-package type. For example, capacity may be a measure of an amount of additional work that may be performed by each AEPS 108. Capacity may be a relative measure that is valid between auxiliary event-package types only. However, capacity may provide no meaning across different auxiliary event-package types (e.g., "presence" auxiliary event-package capacity values may not be comparable to "call-info" auxiliary event-package capacity values). The capacity may be included in a header tag, such as a SIP header tag that is included in a NOTIFY SIP message (RFC 3265).

According to one embodiment, the indicators of capacity may be integer relative capacity values ranging from a lowest capacity at a first integer to a highest capacity at an last integer. For example, a capacity indicator included in the NOTIFY SIP header tag may provide an integer relative capacity value between 0 and 10. A capacity of 10 may indicate a strongest affinity (i.e., the event-package instances has the most capacity) and a capacity of 0 may indicate a weakest affinity (i.e., the event-package instance has the least capacity). The incremental integer values between the capacity 0 and 10 may be determined on a scale and a capacity level based on the auxiliary event-package type and particular implementation. For example, the scale may be linear, logarithmic, etc. and the integer values and corresponding capacity levels may be selected to substantially achieve a particular objective, such as response to changes in capacity within particular load ranges.

User agent 114 may select a highest capacity AEPS 108 as a primary handle for the auxiliary event-package. User agent 114 may use the selected AEPS 108 as the primary handle until user agent 114 determines that a different AEPS 108 has become the highest capacity AEPS 108. User agent 114 may then select the different AEPS 108 as the new primary handle for the auxiliary event-package.

According to one embodiment, user agent 114 may receive an accept notification (not shown) and notify 158 for all instances of the auxiliary event-package in the SIP domain of proxy 106. The first notify 158 received by user agent 114 (i.e., the first notify 158 of notifies 158 corresponding to each of AEPSs 108*a*-108*n*) is acknowledged and the sending AEPS 108 (in this instance AEPS 108*a*) becomes the primary handle (e.g., primary server and/or primary device that handles the auxiliary event-package for user agent 114) or the primary subscription. The primary handle may store the indicated current capacity of the first responding AEPS 108 (e.g., Load A of AEPS 108-*a*).

User agent 114 may acknowledge the notification (not shown) and, at or near that time, a new session 160 becomes active (new session 160-1 and new session 160-2 for AEPS 108*a* and AEPS 108*n*, respectively). AEPS 108*a* and AEPS 108*n* may both consider the subscription to the auxiliary event-package as active at that instant.

User agent 114 may publish 164 via proxy 106 and direct the publish request to the primary handle (AEPS 108*a*). User agent 114 may direct any response in a pub/sub architectural pattern to a particular instance of an AOR. For instance, user agent 114 may direct the response to a location subscription to a particular user agent 114 or user device 112.

User agent 114 may compare a relative capacity for AEPSs 108*a*-108*n* associated with a same auxiliary event-package. User agent 114 may select an AEPS 108 with a highest relative capacity value (e.g., an AEPS with a lowest workload). For example, if user agent 114 determines that a later responding AEPS 108 (in this instance AEPS 108-*n*) has a higher capacity than the current primary handle (AEPS 108-*a*), user agent 114 may switch affinity from the current primary handle to the later responding AEPS 108-*n*.

However, if user agent 114 determines that the later responding AEPS 108-*n* has a lower capacity value than the current primary handle (AEPS 108-*a*), user agent 114 may retain the current primary handle (AEPS 108-*a*) as the primary handle. If a subsequent NOTIFY message 158 received from a secondary handle by user agent 114 has a capacity value greater than the primary handle, then user agent 114 may select the secondary handle that has the capacity value greater than the primary handle as the new primary handle. The former primary handle then becomes a secondary handle.

According to one embodiment, user agent 114 may receive capacity values for AEPSs 108*a*-108*n* that include incremental integer values between the capacity 0 and 10. User agent 114 may compare a capacity value of a primary handle (e.g., AEPSs 108*a*) with a capacity value of a secondary handle (e.g., AEPSs 108*n*) and determine whether the primary handle is to be changed based on a threshold difference in capacity of the AEPSs 108*a*-108*n*, e.g., a difference in the incremental integer values of the primary handle and the secondary handle. In other words, user agent 114 may change the primary handle if the capacity of the secondary handle exceeds the capacity of the primary handle by the threshold difference.

For example, the threshold difference may be two. If AEPS 108*a* (the current primary handle) and has a capacity value of six and AEPS 108*n* provides a NOTIFY message 158-*n* indicating a change in capacity value for AEPS 108*n* from a prior value to seven, user agent 114 may maintain AEPS 108*a* as the primary handle. However, if user agent 114 receives a NOTIFY message 158-*n* from AEPS 108*n* indicating a change in capacity value to eight, user agent 114 may change the primary handle to AEPS 108*n*. The threshold may prevent excessive switching for small variations of capacity value (e.g., fluctuating capacity levels within a particular range at either or both AEPS 108*a* and AEPS 108*n*).

Subsequent to selection of the primary handle, user agent 114 communicates with the primary handle (e.g., AEPS 108*a*) for subsequent transactions. Additionally, user agent 114 may keep the subscription active for the secondary handle(s). If the capacity values remain the same, user agent 114 may publish to the primary handle (AEPS 108*a*) from that point forward, and may expect notifications from both the primary handle and secondary handle(s).

User agent 114 may maintain subscriptions to each of the other AEPSs 108*a*-108*n*, which may have a lower capacity than (or an equal capacity to) the primary handle. The additional AEPSs 108*a*-108*n* may become secondary handles (i.e., the secondary publish 164 client) for the auxiliary event-package. User agent 114 may refresh subscriptions periodically according to an expired header field or expired header tag, received for instance in a SIP message such as notify 158, before an expiration timer terminates the subscription. User agent 114 may use SUBSCRIBE 156 refresh response or an unsolicited notify 158 to re-determine the server affinity. If the capacity value of one of the secondary handles becomes greater than the capacity value of the primary handle, user agent 114 selects the secondary handle as the new primary handle.

Load balancing of AEPSs 108*a*-108*n* in network 100 occurs where user agent 114 selects an AEPS 108 with a highest capacity value as the primary handle. Additional load balancing at other levels of network 100 may be performed by load balancers (not shown).

According to a further implementation, the primary handle (AEPS 108*a*) may become unavailable 174 for providing the auxiliary event-package. For example, the hosting server for AEPS 108*a* may become unavailable 174. User agent 114 requires the primary handle (in this instance AEPS 108*a*) to be available only at instances in which user agent 114 is to perform a specific action, for example, to output another publication (publish 164). Proxy 106 may receive information regarding the unavailable status 176 of AEPS 108*a*. For instance, proxy 106 may determine the unavailable status 176 of AEPS 108*a* based on either discovering the unavailable status or based on failure of a refresh rebind process for AEPS 108*a*. In response to publish 164 from user agent 114, proxy 106 may provide notification that the primary handle is unavailable 176. Proxy 106 may provide notification by either sending a client status code message (i.e., a 480 SIP message) or a server error status code message (i.e., a 503 SIP message) based on the particular implementation of proxy 106.

User agent 114 may compare capacity values for the secondary handles after receiving the notification that the primary handle is unavailable 176. User agent 114 may select a secondary handle that has a highest capacity value as a new primary handle (AEPS 108*n*) and release the now former primary handle (AEPS 108*a*). User agent 114 may attempt to maintain a subscription state for the former primary handle. User agent 114 may attempt to reestablish a connection to the former primary handle (AEPS 108*a*) at a predetermined refresh rate. User agent 114 may publish 164 (republish to primary 172) to the new primary handle (AEPS 108*n*).

The foregoing implementation may be applied to either a stateful or stateless auxiliary event-package, allow multiple subscriptions per AOR (i.e., AOR instances) and establish server-affinity (i.e., affinity to a particular AEPS 108) at the time of subscription, and re-establish server-affinity on receiving SIP 480/Unavailable message, and on receiving changes in capacity values, for instance, on refresh re-subscribe. A stateless auxiliary event-package treats each request as an independent transaction. A stateful auxiliary event-package has a current state that may be dependent on past states and/or transactions. The implementation may utilize current standards for SIP communication between a proxy and an event-package, and may enable a developer or network administrator to dynamically load balance AEPS 108*a*-108*n* without regard to the soft-switch, gateway or proxy vendor, or the network environment in which the soft-switch is placed.

FIG. 1C is an exemplary SIP header 190 for a NOTIFY message. Header 190 may have been generated by AEPS 108*a*, for example, in response to a subscribe 156-1 from user agent 114. As shown in FIG. 1C, header 190 includes the following fields: a Max-Forwards field, a Capacity field, a Contact field, a To field, a From field, a Call-ID field, a CSeq field, a Subscription State field, an Event field, and a Content-Length field. In addition to those fields, header 190 includes a request line or field (e.g., the first line of header 190), which includes the method (e.g., NOTIFY), a request-URI (e.g., sip:user@10.211.55.3:1430), and the SIP version (e.g. SIP/2.0). Header 190 is exemplary and may include additional or fewer fields. Further the information in header 190 is exemplary. The fields in header 190 are described in more detail below.

The Max-Forwards field may be used to limit the number of hops a request can make on the way to its destination. The Max-Forwards field may include an integer that is decremented by one at each hop.

The Capacity field may indicate a capacity of a sending AEPS 108. The capacity indicator included in the NOTIFY SIP header tag may provide an integer relative capacity value between 0 and 10. For example, capacity in header 190 is 9.

The Contact field may include a SIP or SIPS URI that can be used to contact that specific instance of the user agent for subsequent requests, such as sip:profile@166.35.250.202:13100;rinstance=827027bb7917b598;transport=TCP>. The SIP or SIPS URI may represent a direct route to contact the originator (e.g., user), usually composed of a username at a fully qualified domain name (FQDN). While an FQDN is preferred, many end systems do not have registered domain names, so IP addresses may be used. The Contact field indicates where to send future requests.

The To field may include the desired or logical recipient of the request or the address-of-record of the user or resource that is the target of this request. For example, the To field may include a SIP URI or SIPS URI (e.g., <sip:user@ucc.providerbusiness.com>) to which the request is originally directed. If a dialog has already been established, the To field may include a To tag, which may identify the peer of the dialog (e.g., tag=7d72f81f). If the SIP request is outside a dialog, then the To field may not include a To tag.

The From field indicates the logical identity of the initiator of the request, possibly the user's address-of-record. For example, the From field may also include a display name (e.g., Alice) and a SIP URI or SIPS URI (e.g., <sip:profile@package.providerbusiness.com>) that indicates the originator of the request. The From field may also include a tag parameter that includes a string (e.g., a random string such as, tag=292be912) added to the URI by the originating user agent, for example. The string may be used for identification purposes.

The Call-ID field may acts as a globally unique identifier for a series of SIP messages, such as a series of SIP messages to establish a session. For example, the unique identifier for the session may be generated by the combination of a random string and the user agent's host name or IP address. The combination of the To tag, From tag, and Call-ID may completely define a peer-to-peer SIP relationship between originator (e.g., AEPS 108*a*) and target (e.g., user agent 114) and is referred to as a dialog.

The CSeq or Command Sequence field may serve as a way to identify and order transactions. For example, the CSeq field may include an integer and a method name. The integer may be incremented for each new request within a dialog and may include a traditional sequence number.

The Subscription State field may indicate a subscription state of user agent 114. For example, user agent 114 may have an active subscription with a primary handle and secondary handles for a particular auxiliary event-package.

The Event field may indicate a type of event for the auxiliary event-package that user agent 114 may subscribe to. For example, the event may be a location or a profile event.

The Content-Length field may indicate the length (e.g., an octet or byte count) of the message body. The Content-Type field (not shown) describes the Internet media type of the message body, such as whether the body of the message has been encoded using compression.

SIP dialog is identified by a combination of the Call-ID, From tag and To tag. A SIP transaction is identified by the branch parameter of the Via header and the Method name in the CSeq field. These fields can be used to construct respective dialog ID and transaction ID identifiers. Both the dialog ID and the transaction ID may be used by embodiments to maintain the corresponding state.

Figure 2:
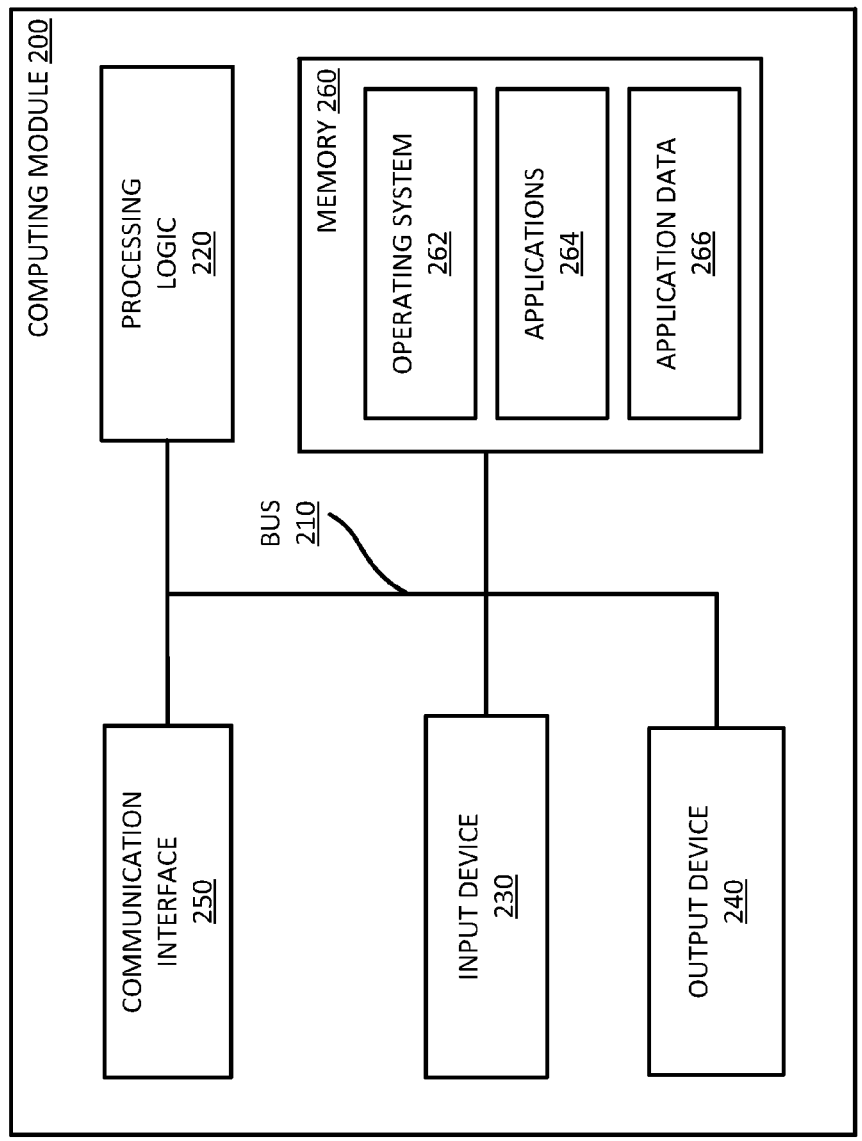
FIG. 2 is a block diagram of exemplary components of a computing module 200.

Devices in network 100 may each include one or more computing modules. FIG. 2 is a block diagram of exemplary components of a computing module 200. Computing module 200 may include a bus 210, processing logic 220, an input device 230, an output device 240, a communication interface 250, and a memory 260. Computing module 200 may include other components (not shown) that aid in receiving, transmitting, and/or processing data. Moreover, other configurations of components in computing module 200 are possible.

Bus 210 may include a path that permits communication among the components of computing module 200. Processing logic 220 may include any type of processor or microprocessor (or families of processors or microprocessors) that interprets and executes instructions. In other embodiments, processing logic 220 may include an application-specific integrated circuit (ASIC), a field-programmable gate array (FPGA), a multi-core processor, a reduced-instruction set code (RISC) processor, etc.

Input device 230 may allow a user to input information into computing module 200. Input device 230 may include a keyboard, a mouse, a pen, a microphone, a remote control, an audio capture device, an image and/or video capture device, a touch-screen display, etc. Some user devices 112, such as home phone may include a keypad for entering telephone numbers when calling a party. Other user devices, such as a mobile phone, may include a keypad or a touch screen for entering numbers for calling a party. On the other hand, SIP proxies 106 may be managed remotely and may not include input device 230. In other words, some devices may be "headless" and may not include a keyboard, for example.

Output device 240 may output information to the user. Output device 240 may include a display, a printer, a speaker, etc. For example, user devices 112 may include a liquid-crystal display (LCD) for displaying information to the user, such as the name and/or number of a calling party. Headless devices, such as proxy 106, may be managed remotely and may not include output device 240.

Input device 230 and output device 240 may allow a user to activate and interact with a particular service or application, such as telephone application to call a party. Input device 230 and output device 240 may allow a user to receive and view a menu of options and select from the menu options. The menu may allow the user to select various functions or services associated with applications executed by computing module 200.

Communication interface 250 may include a transceiver that enables computing module 200 to communicate with other devices or systems. Communication interface 250 may include a transmitter that converts baseband signals to radio frequency (RF) signals or a receiver that converts RF signals to baseband signals. Communication interface 250 may be coupled to an antenna for transmitting and receiving RF signals. Communication interface 250 may include a network interface card, e.g., Ethernet card, for wired communications or a wireless network interface (e.g., a WiFi) card for wireless communications. Communication interface 250 may also include, for example, a universal serial bus (USB) port for communications over a cable, a Bluetooth™ wireless interface, a radio-frequency identification (RFID) interface, a near-field communications (NFC) wireless interface, etc.

Memory 260 may store, among other things, information and instructions (e.g., applications 264 and operating system 262) and data (e.g., application data 266) for use by processing logic 220. Memory 260 may include a random access memory (RAM) or another type of dynamic storage device, a read-only memory (ROM) device or another type of static storage device, and/or some other type of magnetic or optical recording medium and its corresponding drive (e.g., a hard disk drive).

Operating system 262 may include software instructions for managing hardware and software resources of computing module 200. For example, operating system 262 may include Linux, Windows, OS X, OpenSolaris, Unix, etc. In instances in which user device 112 is a mobile phone, for example, operating system 262 may include MeeGo, Android, WebOS, iOS, Symbian, etc. Applications 264 and application data 266 may provide network services and/or include applications, depending on the device in which the particular computing module 200 is implemented.

In an exemplary implementation, computing module 200 may perform the operations described herein in response to processing logic 220 executing software instructions contained in a computer-readable medium, such as memory 260. A computer-readable medium may be defined as a physical or logical memory device. The software instructions may be read into memory 260 from another computer-readable medium (e.g., a hard disk drive (HDD), SSD, etc.), or from another device via communication interface 250. Alternatively, hard-wired circuitry may be used in place of or in combination with software instructions to implement processes consistent with the implementations described herein. Thus, implementations described herein are not limited to any specific combination of hardware circuitry and software.

Figure 3:
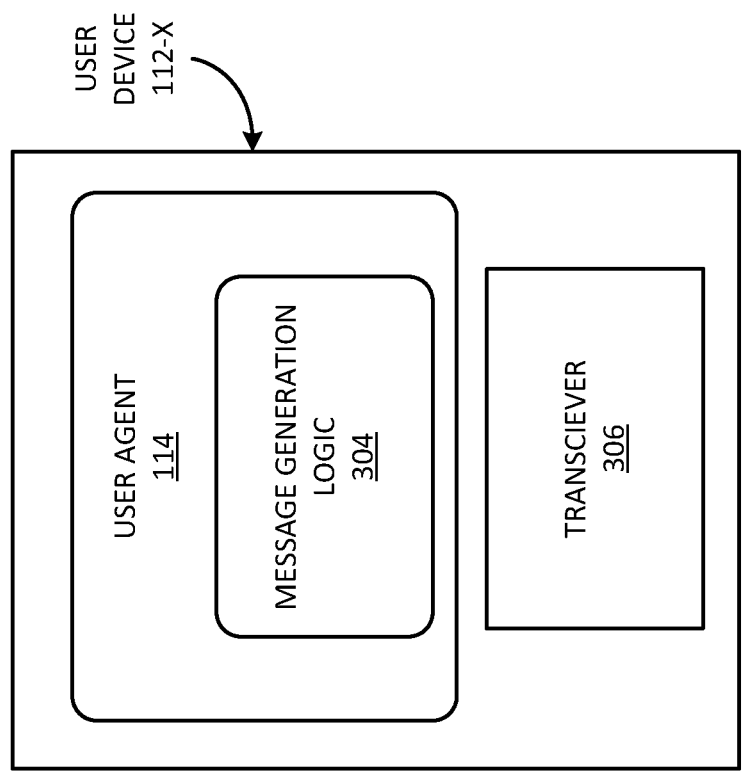
FIG. 3 is a block diagram of exemplary components of one or more of the devices of FIG. 1A.

FIG. 3 is a block diagram of exemplary components of user device 112. User devices 112 may each include a transceiver 306 and a user agent 114, which may further include message generation logic 304. The components of device 112-*x* are shown for ease of understanding and simplicity. Device 112-*x* may include more, fewer, or a different arrangement of components.

User agent 114 may use a protocol (e.g., SIP) to establish, define, and terminate sessions with other devices. A session may include a lasting connection between two devices that may carry a stream of packets from one device to the other and/or vice versa. User agent 114 may perform the functions of a user agent client (UAC) and/or a user agent server (UAS). A UAC is a logical entity that creates a new request, and then uses client transaction state logic to send the request. The role of UAC may last for the duration of that transaction. In other words, if device 112-*x* initiates a request, user agent 114 acts as a UAC for the duration of that transaction. On the other hand, a UAS is a logical entity that generates a response to a SIP request. The response accepts, rejects, or redirects the request. The role of UAS may last for the duration of that transaction. In other words, if device 112-*x* responds to a request, user agent 114 acts as a UAS for the duration of that transaction.

Transceiver 306 may receive and transmit SIP messages included in a SIP dialog. SIP dialog may be identified by a combination of the Call-ID, From tag and To tag. A SIP transaction is identified by the branch parameter of a Via header and the Method name in the CSeq field. These fields can be used to construct respective dialog ID and transaction ID identifiers.

Figure 4:
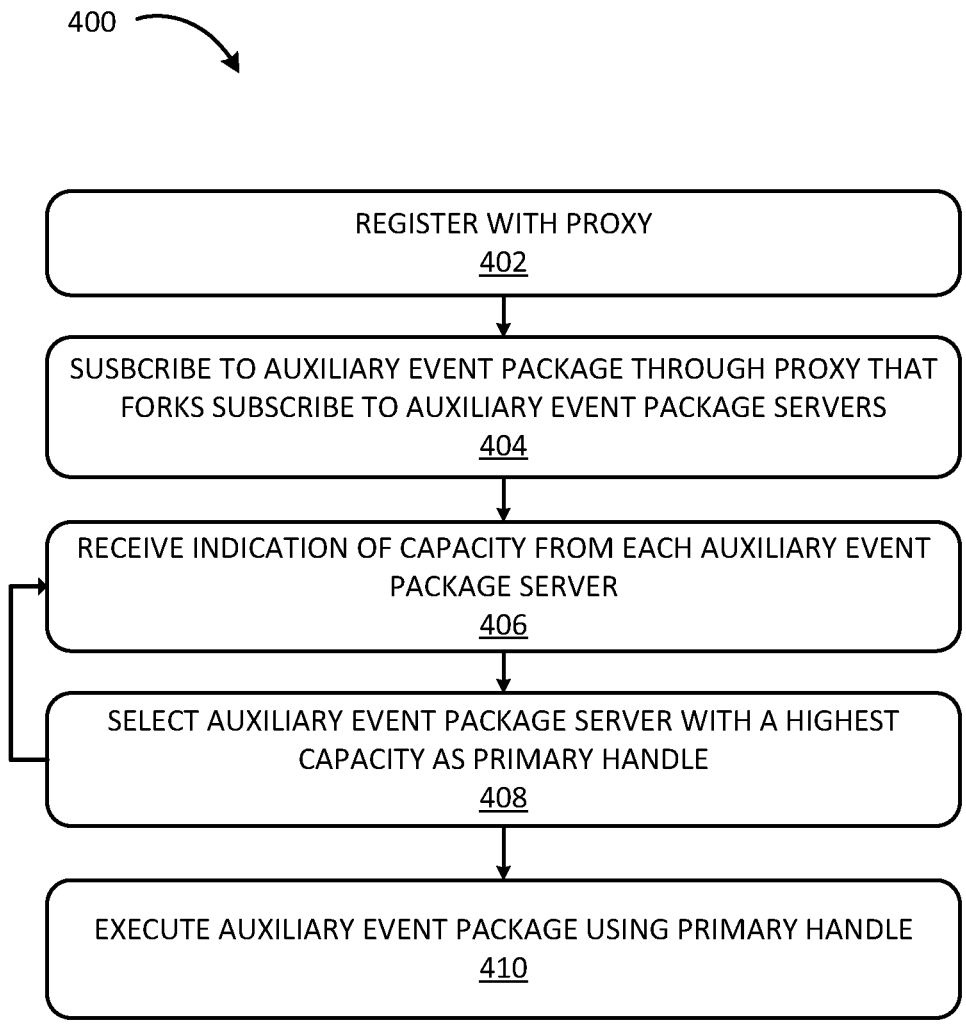
FIG. 4 is a flowchart of an exemplary process for selecting an auxiliary event-package server as a primary handle.

FIG. 4 is a flowchart of an exemplary process 400 for selecting an auxiliary event-package server as a primary handle. The data flows associated with process 400 are described in conjunction with signal flow 150 in FIG. 1B. Process 400 may execute in a user agent 114 and/or user device 112 (e.g., mobile phone, personal computer). It should be apparent that the process discussed below with respect to FIG. 4 represents a generalized illustration and that other elements may be added or existing elements may be removed, modified or rearranged without departing from the scope of process 400. Although FIG. 4 is described with respect to a user agent 114, processes described in FIG. 4 may also be applied with respect to user devices 112.

At block 402, user agent 114 may register 154 with proxy 106. For example, user agent 114 may send a registration request to a load balancer (not shown) in network 100 that redirects the registration request to a particular proxy 106 in a SIP proxy farm. Proxy 106 may register user agent 114. Proxy 106 may previously have registered a plurality of auxiliary event-package servers, AEPSs 108a-108n, that host an auxiliary event-package. The auxiliary event-package may be unknown to the SIP soft-switch and SIP gateway, and may extend functionality of user devices 112 on network 100. The auxiliary package may extend a feature set of user device 112. For instance, the auxiliary event-package may comprise a location service that publishes a location of user agent 114 to subscribers of the location service.

At block 404, user agent 114 may subscribe 156 to the auxiliary event-package through proxy 106. For example, user agent 114 may subscribe 156 to a location event-package that is a third party event-package to network 100. Proxy 106 may fork 182 the subscription request 156 to AEPSs 108a-108n, which host instances of the auxiliary event-package. According to an implementation, proxy 106 forks 182 the subscribe 156 (sends subscribe 156-1, subscribe 156-2) to all instances of AEPSs 108a-108n.

At block 406, a notify message 158, including an indication of capacity, may be received from each of AEPSs 108a-108n by user agent 114. For example, each of AEPSs 108a-108n may send an initial notify in response to receiving subscribe 156 messages received from user agent 114. Alternatively, AEPSs 108a-108n may send unsolicited notifies in response to changes in the capacity (i.e., changes in an integer value of the capacity).

At block 408, user agent 114 may identify a primary handle based on highest capacity. For example, as described in detail below with respect to FIG. 5, user agent 114 may compare capacities received from each of AEPSs 108a-108n. User agent 114 identifies the AEPS 108 that has a highest capacity as a primary handle for the auxiliary event-package for user agent 114 and may establish server-affinity at that time to the primary handle. User agent 114 may identify the remaining AEPSs 108 as secondary handles for the auxiliary event-package.

At block 410, user agent 114 may communicate with the primary handle to execute the auxiliary event-package. User agent 114 may communicate with the particular AEPSs 108 that serves as the primary handle to access features of the auxiliary event-package. For example, user agent 114 may publish to the primary handle and receive notifies 168 in response to call actions (not shown) and ensuing call updates from an application server (not shown) in network 100.

Figure 5:
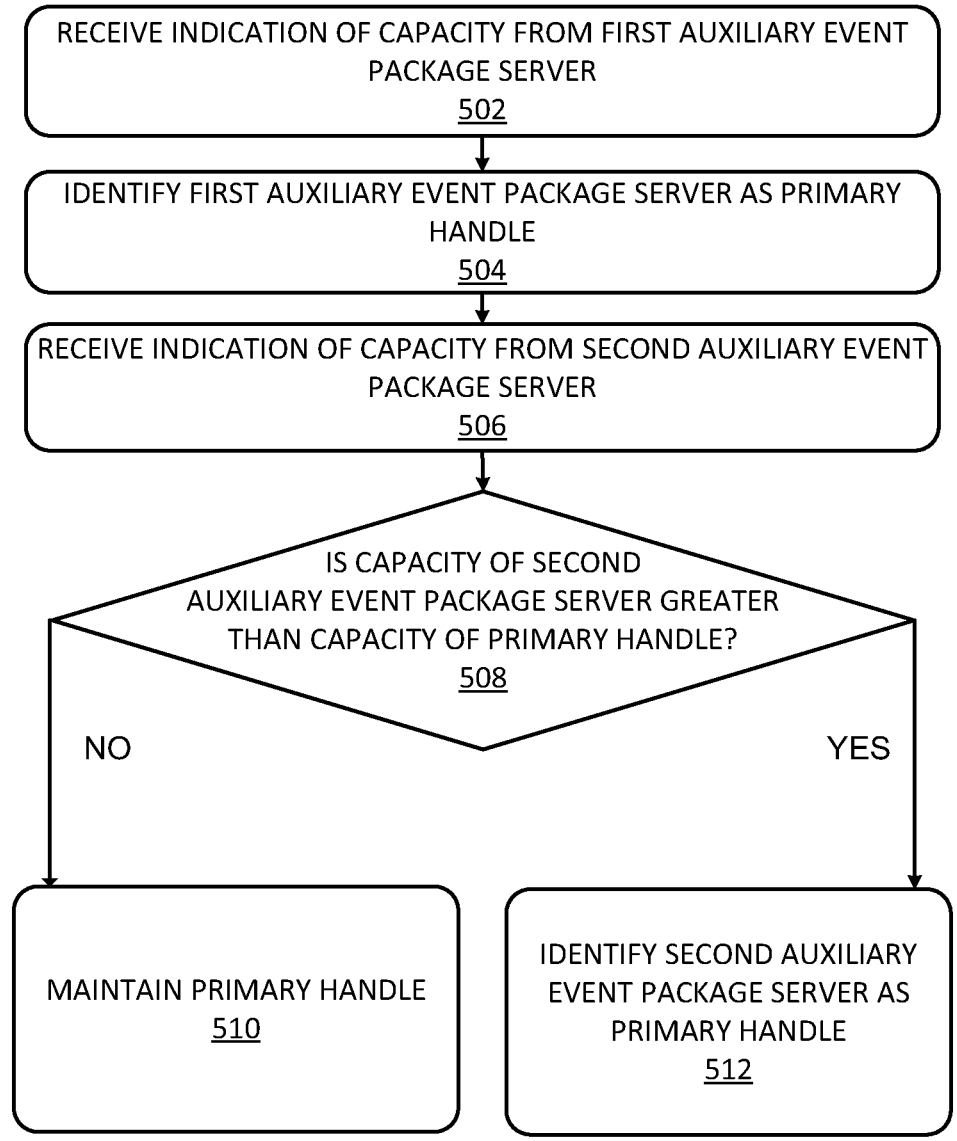
FIG. 5 is another flowchart of an exemplary process for selecting an auxiliary event-package server as a primary handle.

FIG. 5 is a flowchart of an exemplary process 500 for selecting an AEPS 108 as a primary handle in network 100. The data flows associated with process 500 are described in conjunction with signal flow 150 in FIG. 1B. Process 500 may execute in a user agent 114 and/or user device 112 (e.g., mobile phone, personal computer). It should be apparent that the process discussed below with respect to FIG. 5 represents a generalized illustration and that other elements may be added or existing elements may be removed, modified or rearranged without departing from the scope of process 500. Although process 500 may execute at block 408 of process 400 and may use existing sessions and information determined in process 400, it should be understood that process 500 may be implemented independently (e.g., concurrently, before, after) of process 400.

User agent 114 may receive an indication of capacity from a first AEPS 108 (block 502) of a plurality of AEPSs 108a-108n. For example, user agent 114 may receive the indication of capacity in a header tag of a notification message (e.g., a NOTIFY in a SIP protocol). At block 504, user agent 114 may identify the first AEPS 108 as a primary handle for the auxiliary event-package. The indication of capacity may be an integer relative capacity, for example between 0 and 10.

At block 506, user agent 114 may receive an indication of capacity from a second AEPS 108. User agent 114 may receive the indication in a header tag of a notification message.

User agent 114 may determine whether the capacity of the second AEPS 108 is greater than the capacity of the primary handle (block 508). For example, user agent 114 may compare the integer relative capacity values of the primary handle and the second AEPS 108 and determine the AEPS 108 that has the higher capacity value.

At block 510, user agent 114 may maintain the primary handle in response to a determination that the capacity of the second AEPS is not greater than the capacity of the primary handle. According to one embodiment, user agent 114 may maintain the primary handle in response to a determination that the capacity of the second AEPS 108 does not exceed the capacity of the primary handle by a threshold value. The second AEPS 108 becomes a secondary handle for the auxiliary event-package.

At block 512, user agent 114 may identify the second AEPS 108 as a primary handle in response to a determination (block 508) that the capacity of the second AEPS 108 is greater than the capacity of the primary handle. The primary handle becomes a secondary handle for the auxiliary event-package.

According to one implementation, in response to a determination that the primary handle is unavailable, user agent 114 may identify the secondary handle that has a highest capacity value s as a new primary handle. For example, user agent 114 may receive a SIP 480/Unavailable message indicating that the primary handle (a particular AEPS 108) is unavailable from proxy 106. User agent 114 may reestablish a connection to the former primary handle once the former primary handle becomes available. User agent 114 may determine whether the former primary handle is to replace the current primary handle based on the highest capacity value of the AEPSs 108a-108n.

The foregoing description provides illustration and description, but is not intended to be exhaustive or to limit the embodiments to the precise form disclosed. Modifications and variations are possible in light of the above teachings or may be acquired from practice of the invention. For example, while series of signal flows have been described with respect to FIG. 1B and series of acts have been described with regard to the flowcharts of FIGS. 4A and 4B, the order of the signals flows and acts may differ in other implementations. Further, non-dependent signal flows and acts may be performed in parallel.

Although embodiments described herein in the context of SIP and an Internet Protocol (IP)-based network, in other implementations equivalent or analogous communication protocols (e.g., International Telecommunication Union (ITU) H.323) and/or types of transport networks (e.g., asynchronous transfer mode (ATM), frame relay, etc.) may be used. Both the ITU H.323 standard and the IETF's SIP standard are examples of protocols that may be used for establishing a communications session among terminals, such as devices 112, connected to a network. Further, a combination of such protocols may be applied in various parts of the overall system.

Embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the embodiments were described without reference to the specific software code—it being understood that one would be able to design software and control hardware to implement the embodiments based on the description herein.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method performed by a user agent device, the method comprising:
    registering, by the user agent device, with a proxy for an auxiliary event-package in a Session Initiation Protocol (SIP) network, wherein the auxiliary event-package provides ancillary action to a published event-package and is provided by a plurality of auxiliary event-package servers, wherein the published event-package is a service in the SIP network;
    subscribing to the auxiliary event-package through the proxy, wherein the proxy forwards the subscription to the plurality of auxiliary event-package servers;
    receiving a notification from each of the auxiliary event-package servers that includes an indicator of current capacity, wherein the indicator of current capacity provides a relative measure of capacity of the corresponding auxiliary event-package server for the auxiliary event-package;
    determining, by the user agent device, an auxiliary event-package server having a highest capacity based on the indicators of current capacity of the auxiliary event-package servers;
    selecting, by the user agent device, the auxiliary event-package server having the highest capacity as a primary handle for the auxiliary event-package, wherein the primary handle comprises a primary device that handles the auxiliary event-package for the user agent device;
    identifying remaining auxiliary event-package servers of the plurality of auxiliary event-package servers as secondary handles for the auxiliary event-package;
    identifying one or more of the secondary handles as potential primary handles in response to a determination that the capacity of the one or more secondary handles is greater than a capacity of the primary handle;
    selecting one of the one or more secondary handles as a new primary handle in response to a determination that the capacity of the selected secondary handle exceeds the capacity of the primary handle by a threshold difference; and
    wherein the auxiliary event-package comprises a location service that publishes a location of a user agent to subscribers of the location service.

2. The computer-implemented method of claim 1, further comprising:
    receiving a second indicator of current capacity from at least one of the auxiliary event-package servers;
    determining whether a capacity of a secondary handle is greater than a capacity of the primary handle based on the second indicator of current capacity from the at least one of the auxiliary event-package servers; and
    maintaining the primary handle in response to a determination that the capacity of the secondary handle is not greater than a capacity of the primary handle.

3. The computer-implemented method of claim 2, wherein determining whether the capacity of the secondary handle is greater than the capacity of the primary handle further comprises:
    determining whether the capacity of the secondary handle exceeds the capacity of the primary handle by a threshold difference.

4. The computer-implemented method of claim 1, further comprising:
    determining that the primary handle is unavailable to execute the auxiliary event-package; and
    identifying a secondary handle having a highest capacity value as a new primary handle.

5. The computer-implemented method of claim 1, further comprising:
    performing at least one of a refresh or a re-subscribe;
    determining whether a capacity of one of the secondary handles becomes greater than the capacity of the primary handle; and
    selecting the one of the secondary handles as the new primary handle.

6. The computer-implemented method of claim 1, further comprising:
    executing the auxiliary event-package using the primary handle.

7. The computer-implemented method of claim 1, wherein the indicators of current capacity comprise integer relative capacity values ranging from a lowest capacity at a first integer to a highest capacity at a last integer.

8. The computer-implemented method of claim 7, wherein the integer relative capacity values are measured on one of a linear scale, or a logarithmic scale.

9. The computer-implemented method of claim 1, wherein the indicator of capacity is included in a header of a notify message.

10. The computer-implemented method of claim 1, wherein the user agent device updates a presence status by publishing information regarding presence of the user agent device.

11. A user agent device comprising:
    a memory to store a plurality of instructions; and
    a processor configured to execute instructions in the memory to:
    register with a proxy for an auxiliary event-package in a Session Initiation Protocol (SIP) network, wherein the auxiliary event-package provides ancillary action to a published event-package and is provided by a plurality of auxiliary event-package servers, wherein the published event-package is a service in the SIP network;

subscribe to the auxiliary event-package through the proxy, wherein the proxy forwards the subscription to the plurality of auxiliary event-package servers;

receive a notification from each of the auxiliary event-package servers that includes an indicator of current capacity, wherein the indicator of current capacity provides a relative measure of capacity of the corresponding auxiliary event-package server for the auxiliary event-package;

determine an auxiliary event-package server having a highest capacity based on the indicators of current capacity of the auxiliary event-package servers;

select the auxiliary event-package server having the highest capacity as a primary handle for the auxiliary event-package, wherein the primary handle comprises a primary device that handles the auxiliary event-package for the user agent device;

identify the remaining auxiliary event-package servers of the plurality of auxiliary event-package servers as secondary handles for the auxiliary event-package;

identify one or more of the secondary handles as potential new primary handles in response to a determination that the capacity of the one or more secondary handles is greater than a capacity of the primary handle;

select one of the one or more secondary handles as a new primary handle in response to a determination that the capacity of the selected secondary handle exceeds the capacity of the primary handle by a threshold difference; and wherein the auxiliary event-package comprises a location service that publishes a location of a user agent to subscribers of the location service.

12. The user agent device of claim 11, wherein the processor is further configured to receive a second indicator of current capacity from at least one of the auxiliary event-package servers;

determine whether a capacity of a secondary handle is greater than a capacity of the primary handle based on the second indicator of current capacity from the at least one of the auxiliary event-package servers; and maintain the primary handle in response to a determination that the capacity of the secondary handle is not greater than a capacity of the primary handle.

13. The user agent device of claim 12, wherein, when determining whether the capacity of the secondary handle is greater than the capacity of the primary handle, the processor is further configured to:

determine whether the capacity of the secondary handle exceeds the capacity of the primary handle by a threshold difference.

14. The user agent device of claim 11, wherein the processor is further configured to:

perform at least one of a refresh or a re-subscribe;

determine whether a capacity of one of the secondary handles becomes greater than the capacity of the primary handle; and select the one of the secondary handles as the new primary handle.

15. A non-transitory computer-readable medium including instructions to be executed by a processor, the instructions including one or more instructions, which when executed by the processor, cause the processor to:

register, by a user agent device, with a proxy for an auxiliary event-package in a Session Initiation Protocol (SIP) network, wherein the auxiliary event-package provides ancillary action to a published event-package and is provided by a plurality of auxiliary event-package servers, wherein the published event-package is a service in the SIP network;

subscribe to the auxiliary event-package through the proxy, wherein the proxy forwards the subscription to the plurality of auxiliary event-package servers;

receive a notification from each of the auxiliary event-package servers that includes an indicator of current capacity, wherein the indicator of current capacity provides a relative measure of capacity of the auxiliary event-package server for the auxiliary event-package;

determine, by the user agent device, an auxiliary event-package server having a highest capacity based on the indicators of current capacity of the auxiliary event-package servers;

select the auxiliary event-package server having the highest capacity as a primary handle for the auxiliary event-package, wherein the primary handle comprises a primary device that handles the auxiliary event-package for the user agent device;

identify remaining auxiliary event-package servers of the plurality of auxiliary event-package servers as secondary handles for the auxiliary event-package;

identify one or more of the secondary handles as potential new primary handles in response to a determination that the capacity of the one or more secondary handles is greater than a capacity of the primary handle;

select one of the one or more secondary handles as a new primary handle in response to a determination that the capacity of the selected secondary handle exceeds the capacity of the primary handle by a threshold difference; and wherein the auxiliary event-package comprises a location service that publishes a location of a user agent to subscribers of the location service.

16. The non-transitory computer-readable medium of claim 15, where the one or more instructions further includes instructions for causing the processor to:

receive a second indicator of current capacity from at least one of the auxiliary event-package servers;

determine whether a capacity of a secondary handle is greater than a capacity of the primary handle based on the second indicator of current capacity from the at least one of the auxiliary event-package servers; and maintain the primary handle in response to a determination that the capacity of the secondary handle is not greater than a capacity of the primary handle.

17. The non-transitory computer-readable medium of claim 15, where the one or more instructions further includes instructions for causing the processor to:

determine that the primary handle is unavailable to execute the auxiliary event-package; and identify a secondary handle having a highest capacity value as a new primary handle.

* * * * *